3,038,791
PHENYL PHOSPHATE COMPOSITIONS
Harold D. Orloff, Oak Park, Mich., and Francis X. Markley, Bound Brook, N.J., assignors to Ethyl Corporation, New York, N.Y., a corporation of Delaware
No Drawing. Filed July 16, 1959, Ser. No. 827,450
8 Claims. (Cl. 44—69)

This invention relates to novel and eminently useful phenyl phosphate compositions and their use as ignition control compounds in gasoline and antiknock fluid compositions. It is thus an object of this invention to provide such compositions and gasoline fuels and antiknock fluid mixtures containing them. Other objects will appear hereinafter.

Triphenyl phosphate is known to be effective as a spark plug antifoulant when dissolved in small concentrations in gasoline fuels. However, this compound is deficient in a number of respects. It is a solid at normal temperatures, its melting point being 120–122° F. Furthermore, its gasoline solubility is much less than is desirable in a gasoline additive.

The foregoing deficiencies have thus far precluded the commercial use of triphenyl phosphate as a gasoline additive despite its well known ability to effectively combat the spark plug fouling problem. Given the choice between a highly-soluble, liquid gasoline additive and a solid gasoline additive of poorer fuel solubility, the refiner will always choose the liquid material, assuming, of course, that the cost-effectiveness capabilities of each are comparable. His reasons are many. A poorly-soluble, solid additive is harder to blend with gasoline under the conditions prevailing in the typical refinery. For example, the usual liquid proportioning pumps and like blending equipment often will not uniformly distribute such an additive into the gasoline under the high-speed fuel flow rates normally used.

In addition, a solid, marginally-soluble additive has a tendency to separate from the gasoline under low temperature storage conditions. Furthermore, such an additive contributes heavily to induction system deposits and the problems associated with them. Moreover, it is axiomatic that if an ignition control additive does not reach the combustion chamber it cannot exert its intended beneficial functions. Reference should be had to U.S. Patent 2,862,801 for further details concerning the great importance in an additive of high gasoline solubility and adequate engine inductibility.

A new, liquid, highly gasoline-soluble phenyl phosphate composition has been discovered. This composition, though it contains a substantial proportion of triphenyl phosphate, is a striking improvement thereupon.

The phenyl phosphate mixtures of this invention consist essentially by weight of about 5 to about 45 percent triphenyl phosphate, about 10 to about 55 percent diphenyl methyl phosphate, and about 30 to about 80 percent phenyl dimethyl phosphate. Such mixtures are characterized in part by being liquids at ordinary temperatures, by being highly soluble in a wide variety of gasolines of greatly differing hydrocarbon types, by being essentially insoluble in water, by being exceedingly effective in controlling the engine problems of surface ignition and spark plug fouling, by exerting at most only an insignificant amount of tetraethyllead antiknock antagonism, and by possessing the remarkable property being induction system cleanliness agents. Another important feature of these novel phosphate mixtures is that the foregoing highly important technical advantages are virtually unaffected by variations in the relative proportions of the three ingredients within the ranges specified above. In other words, any mixture as described above possesses all of these very beneficial properties.

The phenyl phosphate mixtures of this invention can be prepared by mixing together appropriate amounts of the several ingredients. For example, 10 parts by weight each of triphenyl phosphate and diphenylmethyl phosphate are readily admixed with 80 parts by weight of phenyldimethyl phosphate to provide a novel and eminently useful composition of this invention.

Another way of making the mixtures of the present invention is to react phosphoryl chloride ($POCl_3$) with phenol to form an appropriate mixture of triphenyl phosphate, diphenyl phosphoryl chloride and phenyl phosphoryl dichloride. This is done by charging into the reactor about 1 to about 1.6 moles of phenol per mole of phosphoryl chloride. A small amount of aluminum chloride is preferably used as catalyst. Reaction temperature is in the range of about 10 to about 30° C. This resultant mixture is then charged into excess methanol (about 4 to about 8 moles per mole of phosphoryl chloride originally used) and the temperature kept in the range of about 75 to about 125° C. In this way the phenyl phosphate mixtures of this invention are formed in excellent yields.

The physical properties of a typical phenyl phosphate mixture of this invention (approximate analysis by weight: 40 percent triphenyl phosphate, 15 percent diphenyl methyl phosphate, 45 percent phenyl dimethyl phosphate) are as follows.

Form _____ Liquid.
Color _____ Clear light straw.
Specific gravity at 68° F. _____ 1.26.
Weight, lb./gal. at 68° F. _____ 10.5.
Flash point (open cup), ° F. _____ >300.
Pour point, ° F. _____ <−50.
Solubility in water at 86° F.:
  Wt. percent _____ <0.001.
  P.p.m. _____ <10.

The finished gasoline fuel compositions forming another part of this invention preferably contain from about 10 to about 1500 parts per million (p.p.m.) of the above phosphate mixture. In this range of concentration surface ignition, rumble and spark plug fouling difficulties caused by existing engine deposits from the prior use of conventional gasoline compositions are sharply reduced in a very short period of engine operation. However, a valuable feature of this invention is that the tremendously great gasoline solubility of the phosphate mixtures enables the preparation of highly-concentrated gasoline fuels (containing up to 750,000 p.p.m. of the phosphate, or even higher) which fuels are likewise an embodiment of this invention. These concentrated fuels are of especial value to refiners who desire concentrated blending solutions for use in preparing the more dilute finished fuels of this invention. In addition, these concentrated fuels are of value in special engine studies, such as tests to determine the distribution properties of fuels composed of differing blending stocks, etc. Moreover, these concentrated fuels can be used to operate engines suffering violent surface ignition or rumble problems in order to rapidly eliminate these problems without having to remove the existing engine deposits.

The leaded fuels of this invention contain an antiknock quantity of lead as an organolead antikock agent—this quantity ranging from about 0.02 to about 6.34 grams of lead per gallon. Preferably the lead concentration ranges from about 0.5 to about 4.3 grams per gallon for motor fuel, although higher concentrations are useful in many aviation fuels. The presence of the phosphate mixtures of this invention in these leaded fuels causes sharp reductions in surface ignition, rumble and spark plug fouling.

For best results the phosphate mixture should be present in amount such that the phosphorous-to-lead atom ratio ranges from about 0.02:3 to about 2:3. Preferred ratios are from about 0.4:3 to about 1.2:3.

The antiknock fluid compositions of this invention are composed of an organolead antiknock agent—preferably an alkyllead compound—and a phenyl phosphate mixture as described above in amount such that the phosphorus-to-lead atom ratio is from about 0.02:3 to about 2:3 (preferably from about 0.4:3 to about 1.2:3). These compositions preferably also contain an inert solvent (e.g., kerosene, toluene, xylene, heavy aromatic naphtha, etc.), an organic halide scavenger (e.g., ethylene dibromide, ethylene dichloride, dibromotoluenes, 1,4-dichlorobutane, etc.), an organic dye for identification purposes, or combinations of these.

The elegantly high fuel solubility characteristics of the phosphate compositions of this invention are shown by the following: A typical phosphate mixture of this invention (30 percent triphenyl phosphate, 27 percent diphenyl methyl phosphate, 43 percent phenyl dimethyl phosphate) was tested for gasoline solubility in a commercially-available high-octane motor gasoline of average hydrocarbon composition. Solubility measurements were made at concentrations of the additive ranging from about 32 weight percent (320,000 p.p.m.) to about 83 weight percent (830,000 p.p.m.) based on the fuel. It was found that the additive was completely miscible throughout this concentration range at temperatures of 65° F. and above. In fact, the additive was completely soluble down to 50° F. (10° C.) at 79.2 percent concentration and down to 24.8° F. (−4° C.) at 83.2 percent concentration. It thus appears that the phosphate compositions of this invention have the unique ability to act when present at very high concentrations as solvents for gasoline, thereby providing compositions wherein the higher the phosphorus concentration the lower the separation temperature.

In another test it was found that a 1.5 weight percent solution (15,000 p.p.m.) of the same phenyl phosphate mixture in the gasoline was completely homogeneous even down to a temperature of 58 degrees below zero (−50° C.).

The foregoing great fuel solubilities are completely unexpected, especially in the light of the much poorer solubilities of triphenyl phosphate and phenyl dimethyl phosphate—two ingredients of the phosphate mixtures of this invention. Thus triphenyl phosphate was only soluble in the above gasoline to the extent of 12 weight percent at 59° F., whereas the solubility at this temperature of phenyl dimethyl phosphate was but 18 weight percent.

The remarkable induction system cleanliness properties of the fuels of this invention was demonstrated by a series of standard engine tests. The tests involved running a 1953 6-cylinder passenger car engine at 2000 r.p.m. for 100 hours on each test fuel, the entire induction system of the engine having been thoroughly cleaned prior to starting each test. After each test the induction system of the engine was dimanteled and the parts were inspected for deposits. A rating of 10.0 indicates a perfectly clean part with progressively lower numerical ratings indicating progressively higher amounts of induction system deposits.

In one test the engine was operated on a commercially-available substantially-paraffinic gasoline containing 3.18 grams of lead per gallon as tetraethyllead, 0.5 theory of bromine as ethylene dibromide and 1.0 theory of chloride as ethylene dichloride. In another test, everything was identical except that the above leaded fuel contained a phenyl phosphate mixture of this invention (about 40 percent triphenyl phosphate, about 15 percent diphenyl methyl phosphate, about 45 percent phenyl dimethyl phosphate) in amount such that the phosphorus-to-lead atom ratio was 0.8:3. Thus this latter test served as a direct index of the marked effectiveness of the compositions of this invention in improving the induction system cleanliness of commercial gasoline engines. The results are shown in Table I.

*Table I (The Compositions of This Invention Have Induction System Cleanliness Properties)*

|  | Phosphorus-free fuel | Fuel of this invention | Cleanliness improvement |
| --- | --- | --- | --- |
| Carburetor Throat | 7.5 | 8.5 | +1.0 |
| Intake Manifold: |  |  |  |
| Riser | 7.0 | 8.5 | +1.5 |
| Hot Spot, Interior | 8.0 | 8.5 | +0.5 |
| Branches | 8.0 | 8.0 |  |
| Intake Valves: |  |  |  |
| Valve Head, Top | 6.5 | 7.0 | +0.5 |
| Valve, Underhead | 8.0 | 8.0 |  |
| Valve Stems | 10.0 | 10.0 |  |
| Valve Guides | 8.0 | 10.0 | +2.0 |

The potency of the fuels of this invention in combating surface ignition was also shown by a series of standard engine tests. Using a modern motor gasoline containing 3.18 grams of lead per gallon as tetraethyllead, 0.5 theory of bromine as ethylene dibromide and 1.0 theory of chlorine as ethylene dichloride, a baseline rate of surface ignitions was established. Direct comparisons of surface ignition rate were obtained by repeating the tests using, on the one hand, a phosphate mixture of this invention (40 percent triphenyl phosphate, 15 percent diphenyl methyl phosphate, 45 percent phenyl dimethyl phosphate) and, on the other hand tricresyl phosphate—a presently-used commercial gasoline additive. In all cases the phosphorus-to-lead atom ratios were 0.4:3. The data are in Table II.

*Table II (The Fuels of This Invention Are Very Effective in Controlling Surface Ignition)*

| Phosphorus Additive | Surface Ignition Rate, Percent |
| --- | --- |
| None | 100 |
| Phenyl phosphate mixture of this invention | 23 |
| Tricresyl phosphate | 32 |

It is seen that the novel additives of this invention are even more effective than the commercially-used tricresyl phosphate in squelching surface ignition.

The essential lack of tetraethyllead antagonism exhibited by the present phosphate mixtures was likewise proved by a series of standard engine tests. Typical phosphate mixtures of this invention were dissolved in a standard leaded fuel (3.18 grams of lead per gallon, 0.5 theory of bromine as ethylene dibromide, 1.0 theory of chlorine as ethylene dichloride). Two phosphorus concentrations were used—viz., phosphorus-to-lead atom ratios of 0.4:3 and 1:3. Each of these fuels was then rated for antiknock effectiveness by both the standard ASTM research method (D-908) and the standard ASTM motor method (D-357) and the amount of antagonistic effect, if any, directly measured. The fuels of this invention showed no detectable antagonistic effect whatsoever by the research method. By the motor method there was likewise absolutely no detectable antagonistic effect at the lower phosphorus concentration, while at the higher concentration the octane loss was negligible (0.2 octane).

As brought out above, the phenyl phosphate mixtures are highly fuel-soluble liquids at ordinary temperatures. For one thing, this obviates the need for the time-consuming and expensive expedient of predissolving them in an otherwise inert solvent to permit conventional fuel blending operations. However, some refiners find it advantageous to be supplied with a phosphate additive of a uniform phosphorus content which can be expressed as a whole number. This permits use of pre-assigned settings on blending equipment, minimizes chances of blending errors, etc. A feature of this invention is that very concentrated solutions of these phosphate mixtures can readily be formulated in a variety of inert solvents. These concentrates possess all of the technical advantages characterizing the phosphate mixtures themselves.

Suitable solvents for these concentrates include aromatic hydrocarbons, such as benzene, toluene, the xylenes, catalytically reformed gasoline, heavy aromatic naphtha, the extract from solvent extraction of gasoline, etc.; halogenated hydrocarbons, such as ethylene dibromide, ethylene dichloride, mixed chlorobenzenes, dibromotoluenes, etc.; ethers, such as diethyl ether, dibutyl ether, etc.; ketones, such as acetone, methyl ethyl ketone, etc.; and the like. The aromatic hydrocarbons are preferred for this use.

Following are other examples of phosphate compositions of this invention, all of which give the outstanding results described above. All parts and percents are by weight unless otherwise specified.

EXAMPLE 1

| | Percent |
|---|---|
| Triphenyl phosphate | 5 |
| Diphenylmethyl phosphate | 15 |
| Phenyldimethyl phosphate | 80 |

EXAMPLE 2

| | |
|---|---|
| Triphenyl phosphate | 30.5 |
| Diphenylmethyl phosphate | 11.5 |
| Phenyldimethyl phosphate | 34.5 |
| Toluene | 23.5 |

This concentrated toluene solution has the following physical properties:

| | |
|---|---|
| Form | Liquid. |
| Color | Clear light straw. |
| Specific gravity at 68° F. | 1.168. |
| Weight, lb./gal. at 68° F. | 9.73. |
| Flash point (open cup), ° F. | >109. |
| Pour point, ° F. | <—94. |
| Viscosity, centipoises: | |
| At —22° F. | 80.2. |
| At 86° F. | 4.8. |
| Solubility in water at 86° F.: | |
| Wt. percent | <0.001. |
| P.p.m. | <10. |
| Phosphorus content, wt. percent | 11. |

EXAMPLE 3

| | Percent |
|---|---|
| Triphenyl phosphate | 45 |
| Diphenylmethyl phosphate | 10 |
| Phenyldimethyl phosphate | 45 |

EXAMPLE 4

| | |
|---|---|
| Triphenyl phosphate | 10 |
| Diphenylmethyl phosphate | 55 |
| Phenyldimethyl phosphate | 35 |

EXAMPLE 5

| | |
|---|---|
| Triphenyl phosphate | 25 |
| Diphenylmethyl phosphate | 25 |
| Phenyldimethyl phosphate | 50 |

EXAMPLE 6

| | |
|---|---|
| Triphenyl phosphate | 5 |
| Diphenylmethyl phosphate | 40 |
| Phenyldimethyl phosphate | 55 |

EXAMPLE 7

| | |
|---|---|
| Triphenyl phosphate | 40 |
| Diphenylmethyl phosphate | 30 |
| Phenyldimethyl phosphate | 30 |

EXAMPLE 8

Admixed with 12.7 parts of toluene is 87.3 parts of a mixture composed of 30.0 percent triphenyl phosphate, 26.7 percent diphenylmethyl phosphate and 43.3 percent phenyldimethyl phosphate. The resultant concentrated toluene solution is composed of 26.2 percent triphenyl phosphate, 23.3 percent diphenylmethyl phosphate, 37.8 percent phenyldimethyl phosphate and 12.7 percent toluene.

EXAMPLE 9

With 81.4 parts of a mixture composed of 4.9 percent triphenyl phosphate, 53.3 percent diphenylmethyl phosphate and 41.8 percent phenyldimethyl phosphate is blended 18.6 parts of toluene. The resultant concentrate is composed of 4.0 percent triphenyl phosphate, 43.4 percent diphenylmethyl phosphate, 34.0 percent phenyldimethyl phosphate and 18.6 percent toluene.

EXAMPLE 10

Admixed with 50 parts of ethylene dichloride is 50 parts of a mixture composed of 20 percent triphenyl phosphate, 20 percent diphenylmethyl phosphate and 60 percent phenyldimethyl phosphate.

EXAMPLE 11

The phenyl phosphate mixture of Example 1 is blended with individual portions of a clear (i.e., unleaded) commercially-available gasoline composed of a blend of straight run and catalytically cracked stocks. The phosphorus concentrations in these respective individual portions are 10, 50, 100, 250, 500, 750, 1000 and 1500 p.p.m.

EXAMPLE 12

The phenyl phosphate mixture of this invention described in Example 3 is blended to a concentration of 50 percent (500,000 p.p.m.) in a clear gasoline (a blend of straight run gasoline hydrocarbons and catalytic reformate). Formed is a homogeneous concentrated gasoline solution pursuant to this invention.

EXAMPLE 13

With individual portions of a commercially-available gasoline containing 0.5 gram of lead per gallon as pure tetraethyllead (i.e., no organic halide scavenger) is blended the mixture of Example 4. The phosphorus concentrations in these individual blends are such that the phosphorus-to-lead atom ratios are 0.02:3, 0.05:3, 0.075:3, 0.1:3, 012:3, 0.4:3, 0.6:3, 0.8:3, 1:3, 1.2:3, 1.5:3 and 2:3.

EXAMPLE 14

The procedure of Example 13 is repeated with the exception that the initial gasoline contains 6.34 grams of lead per gallon as tetraethyllead and 1.0 theory of bromine as ethylene dibromide.

EXAMPLE 15

With individual portions of a leaded gasoline (4.3 grams of lead per gallon as tetraethyllead, 0.5 theory of bromine as ethylene dibromide, 1.0 theory of chlorine as ethylene dichloride) is blended the phenyl phosphate mixture of Example 5 to the following concentrations: phosphorus-to-lead atom ratios of 0.1:3, 0.4:3, 0.8:3, 1.4:3 and 1.8:3.

EXAMPLE 16

The procedure of Example 15 is repeated with the exception that in one instance the gasoline contains 2.0 grams of lead per gallon as a mixture composed of 30.0 percent tetraethyllead, 42.1 percent ethyltrimethyllead, 22.2 percent diethyldimethyllead, 5.2 percent triethylmethyllead and 0.5 percent tetraethyllead, and also 0.5 theory of bromine as 1,4-dibromobutane; and in another instance contains 3.5 grams of lead per gallon as tetrabutyllead and 2.5 theories of chlorine as 1,2,4-trichlorobenzene.

EXAMPLE 17

With a gasoline containing 3.18 grams of lead per gallon as tetraethyllead, 0.5 theory of bromine as ethylene dibromide, 1.0 theory of chlorine as ethylene dichloride and 0.25 gram of manganese per gallon as methylcyclopentadienyl manganese tricarbonyl is blended the phenyl phosphate mixture of Example 6 in amount such that the phosphorus-to-lead atom ratio is 0.8:3.

EXAMPLE 18

With a gasoline containing 3.18 grams of lead per gallon as tetraethyllead, 0.5 theory of bromine as ethylene dibromide, 1.0 theory of chlorine as ethylene dichloride and 0.75 percent by volume of tert-butyl acetate is added the phenyl phosphate mixture of Example 2 in amount such that the phosphorus-to-lead atom ratio is 0.4:3.

EXAMPLE 19

Admixed with individual portions of pure tetraethyllead is a mixture composed of 25 percent toluene and 75 percent of the phenyl phosphate combination of Example 1 in amounts such that the phosphorus-to-lead atom ratios are 0.02:3, 0.05:3, 0.1:3, 0.15:3, 0.2:3, 0.4:3, 0.6:3, 0.8:3, 1.2:3, 1.6:3, and 2:3.

EXAMPLE 20

The mixture of Example 5 is blended to a phosphorus-to-lead atom ratio of 0.8:3 with an antiknock fluid composed of tetraethyllead, 0.5 theory of bromine as ethylene dibromide and 1.0 theory of chlorine as ethylene dichloride.

Methods for the preparation of triphenyl phosphate and diphenylmethyl phosphate are well known and reported in the literature. Phenyldimethyl phosphate is best prepared by charging one mole of phenyl phosphoryl dichloride into a reaction vessel containing 5 moles of methanol, the period of addition being one hour with the temperature being held at 25° C. The product is then quenched in 600 parts of an aqueous 5 percent sodium chloride solution, the water layer is decanted off and then the organic layer is distilled at reduced pressure. The phenyldimethyl phosphate is recovered at 114° C. at 2 mm. of mercury pressure.

The organolead antiknock agent used in certain embodiments of this invention can be tetraphenyllead, tetratolyllead, diethyldixylyllead, etc., but notably one which contains a total of from 4 to about 20 carbon atoms in the molecule in the form of 4 alkyl groups directly bonded to a central lead atom. Included among these preferred compounds are tetramethyllead, ethyltrimethyllead, diethyldimethyllead, ethyltrimethyllead, tetrapropyllead, tetraisopropyllead, ethyltributyllead, tetraamyllead and the like. From a number of viewpoints, including cost, availability, ease of manufacture and maximum effectiveness, tetraethyllead is most especially preferred.

The leaded fuels and antiknock fluids of this invention can contain organic halide scavengers. These scavengers can be either aliphatic or aromatic halohydrocarbons or a combination of the two having halogen attached to carbon in either the aliphatic or aromatic portion of the molecule. These scavengers may also be carbon-, hydrogen-, and oxygen-containing compounds, such as haloalkyl ethers, halohydrins, halonitro compounds, and the like. Still other examples of scavengers that may be used in this invention are illustrated in U.S. Patents 1,592,954; 1,668,022; 2,398,281; 2,479,900–903; 2,496,983; 2,661,379; 2,822,252; 2,849,302–304. Mixtures of different scavengers may also be used. Concentrations of organic halide scavengers ranging from about 0.2 to about 2.5 theories based on the lead are usually sufficient, although greater or lesser amounts may be used. (A theory is defined as 2 atoms of halogen per atom of lead.) Thus, in general, use can be made of an amount of organic halide scavenger that is capable of reacting with the lead during engine combustion to form relatively volatile lead halide and thereby effectively control the amount of deposits formed in the engine.

The fuels of this invention, whether leaded or unleaded, can contain additives in addition to the novel phenyl phosphate mixtures. Among these supplemental additives are antiknock agents such as cyclopentadienyl manganese tricarbonyl, indenyl manganese tricarbonyl, manganese pentacarbonyl (i.e., dimanganese decacarbonyl), bis-cyclopentadienyl iron, bis-methylcyclopentadienyl iron, cyclopentadienyl nickel nitrosyl, methylcyclopentadienyl nickel nitrosyl, iron pentacarbonyl, N-methyl aniline, N-methyl toluidine, N-methyl xylidine and the like.

Other suitable additives include antioxidants (e.g. N,N'-di-sec-butyl-p-phenylenediamine, p-N-butylaminophenol, 4-methyl-2,6-di-tert-butyl phenol, 2,6-di-tert-butyl phenol, etc.), metal deactivators (e.g., N,N'-disalicylidene-1,2-diaminopropane, etc.), dyes, boron additives, corrosion inhibitors, detergents, anti-icing additives, induction system cleanliness additives, top cylinder lubricants, and the like. These supplemental additives can also be used in the antiknock fluids of this invention.

What is claimed is:

1. A liquid phenyl composition consitsing essentially by weight of about 5 to about 45 percent triphenyl phosphate, about 10 to about 55 percent diphenylmethyl phosphate and about 30 to about 80 percent phenyldimethyl phosphate.

2. Gasoline containing from about 10 to about 1500 p.p.m. of the composition of claim 1.

3. Leaded gasoline containing the composition of claim 1 in amount such that the phosphorus-to-lead atom ratio is from about 0.02:3 to about 2:3.

4. An antiknock fluid composition which consists essentially of an alkyllead antiknock agent and the composition of claim 1 in amount such that the phosphorus-to-lead atom ratio is from about 0.02:3 to about 2:3.

5. The leaded gasoline composition of claim 3 wherein said lead compound is tetraethyllead.

6. The antiknock fluid composition of claim 4 wherein said alkyllead antiknock agent is tetraethyllead.

7. A concentrate particularly adapted as an additive to gasoline, said concentrate consisting essentially of from 12.7 to 25 parts by weight of an aromatic hydrocarbon and from 75 to 87.3 parts by weight of a mixed liquid phosphate composition consisting essentially by weight of about 5 to about 45 percent triphenyl phosphate, about 10 to about 55 percent diphenyl methyl phosphate and about 30 to about 80 percent phenyl dimethyl phosphate.

8. The concentrate composition of claim 7 wherein said aromatic hydrocarbon is toluene.

References Cited in the file of this patent

UNITED STATES PATENTS

| | | |
|---|---|---|
| 1,844,408 | Nicolai | Feb. 9, 1932 |
| 2,340,331 | Knutson et al. | Feb. 1, 1944 |
| 2,395,380 | Morgan et al. | Feb. 19, 1946 |
| 2,636,861 | Watson | Apr. 28, 1953 |
| 2,678,329 | Gamrath et al. | May 11, 1954 |
| 2,834,733 | Moreton | May 13, 1958 |
| 2,875,230 | Coover et al. | Feb. 24, 1959 |
| 2,889,212 | Yust et al. | June 2, 1959 |
| 2,897,068 | Pellegrini et al. | July 28, 1959 |

FOREIGN PATENTS

| | | |
|---|---|---|
| 683,405 | Great Britain | Nov. 26, 1952 |
| 1,134,156 | France | Nov. 26, 1956 |